W. M. SALISBURY.
ASH SIFTER.
APPLICATION FILED FEB. 19, 1912.
1,069,731.
Patented Aug. 12, 1913.
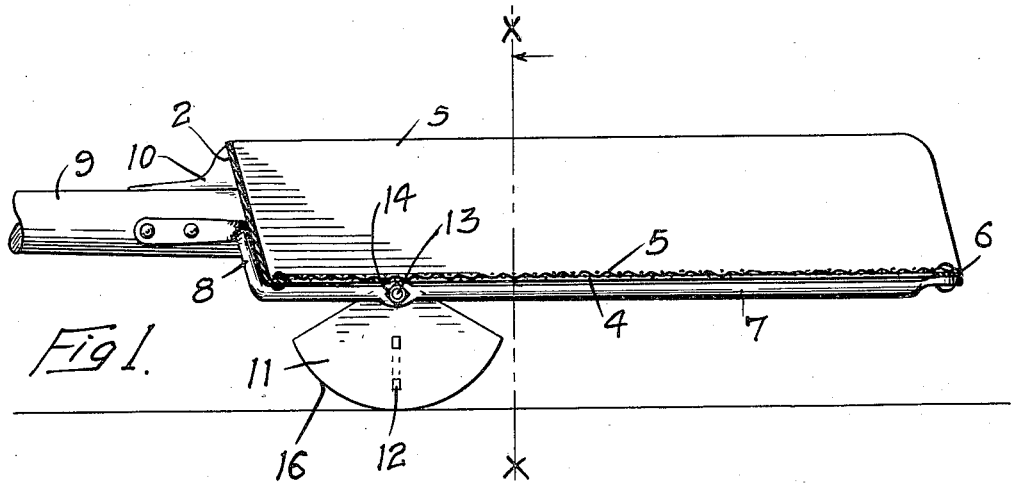
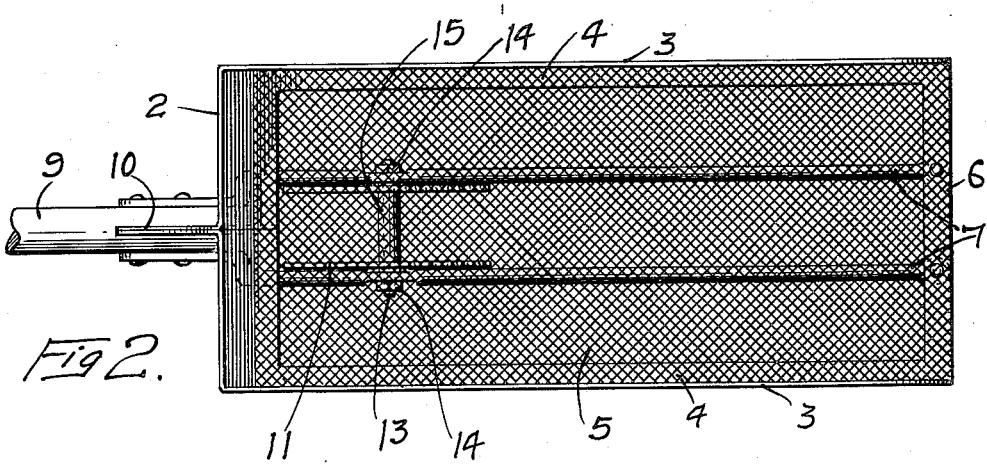
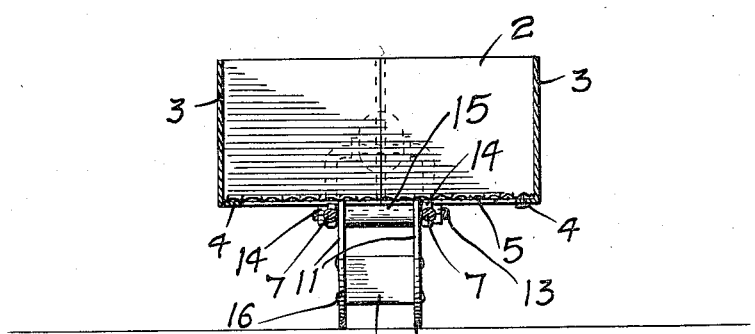
WITNESSES
A. M. Walstrom
G. E. Sorensen
INVENTOR
WILLIE M. SALISBURY
BY Paul & Paul
ATTORNEYS
COLUMBIA PLANOGRAPH CO., WASHINGTON, D. C.

UNITED STATES PATENT OFFICE.

WILLIE M. SALISBURY, OF MINNEAPOLIS, MINNESOTA.

ASH-SIFTER.

1,069,731.  Specification of Letters Patent.  Patented Aug. 12, 1913.

Application filed February 19, 1912. Serial No. 678,507.

*To all whom it may concern:*

Be it known that I, WILLIE M. SALISBURY, of Minneapolis, Hennepin county, Minnesota, have invented certain new and useful Improvements in Ash-Sifters, of which the following is a specification.

My invention relates to ash sifting shovels designed for use in sifting ashes before removing them from the ash pit of the heating plant, and the object of my invention is to provide an improved means by which the sifter shovel can be rocked smoothly and uniformly on the bottom of the ash pit. The invention consists generally in various constructions and combinations, all as hereinafter described and particularly pointed out in the claims.

In the accompanying drawings forming part of this specification, Figure 1 is a longitudinal sectional view of an ash sifter embodying my invention, Fig. 2 is a plan view, Fig. 3 is a transverse sectional view on the line $x$—$x$ of Fig. 1.

In the drawing, 2 represents the end wall of the sifter, 3 the side walls having inwardly turned lower edges 4 to which a screen 5 of suitable mesh is secured. The edges 4 are connected at the forward end of the sifter by a cross bar or plate 6 which braces the side walls and supports the forward portion of the screen. Rods 7 are secured at their forward ends to the cross bar 6 and extend along beneath the screen to the rear end of the shovel and have upwardly turned rear ends 8 to which a handle 9 is secured. These upwardly turned ends, as shown clearly in Fig. 1, are arranged to form a backing or support for the end wall of the shovel, resisting backward strain thereon. The rods 7 also serve to brace and strengthen the shovel in the operation of forcing it into the mass of ashes. A bracket 10 is preferably provided on the end wall 2 and secured to the handle. To support the sifter shovel during the sifting operation I provide a rocker, preferably beneath the rear portion thereof, consisting of sector-shaped plates 11 held in parallel relation with one another by a cross bar or plate 12. A bolt 13 has its ends mounted in the rod 7 and passes through the apex of each plate 11 and carries a sleeve 15 between said plates, against which the plates are clamped by lock nuts 14. The plates thus form a rocker with curved peripheral bearing surfaces 16 which rest upon the floor of the ash pit and support the sifter shovel during the operation of sifting the ashes. The rocker, arranged at a point in the rear of the middle portion of the shovel, will balance the load and allow the convenient reciprocation of the shovel. The curved bearing surfaces 16 are a uniform distance at all points from the pivot of the rocker and consequently the movement of the sifter shovel will be uniform and the same distance from the ash pit floor at all points in its stroke. I have found that this construction insures greater ease of movement of the shovel and also facilitates the sifting operation. The forward and rear portions of the rocker will contact with the bottom of the sifter, exert a jarring or shaking effect thereon which will facilitate the discharge of the ashes through the perforated bottom.

In use, the shovel is thrust into the ash pit and a quantity of ashes gathered up and by rocking the shovel back and forth on the floor of the ash pit the unconsumed portions of coal will be separated from the ashes and may be lifted out and thrown into the fire-pot. The dust rising during the shaking operation will pass up through the grate into the fire instead of settling in the furnace room, as usual in ash sifters where the sifting operation is performed outside of the heater.

I claim as my invention:—

1. The combination, with a sifter shovel having a perforate bottom, of a rocker composed of sector-shaped plates arranged in parallel relation with one another beneath said perforate bottom and having peripheral bearing surfaces, a pivot pin passing through the apex of each plate and journaled in bearings beneath said perforate bottom, the forward and rear portions of said plates being adapted to contact with said perforate bottom at the limit of their rocking movement and to exert a shaking or jarring action thereon.

2. A sifter shovel comprising side and end walls and a perforate bottom, brace bars extending beneath said perforate bottom from end to end of said shovel, a bolt passing through said brace bars and secured thereto, a sleeve mounted on said bolt, sector-shaped rocker plates mounted on said bolt between said sleeve and said rods, and a cross bar rigidly connecting said plates.

In witness whereof, I have hereunto set my hand this 16" day of February, 1912.

WILLIE M. SALISBURY.

Witnesses:
GENEVIEVE E. SORENSEN,
EDWARD A. PAUL.

Copies of this patent may be obtained for five cents each, by addressing the "Commissioner of Patents, Washington, D. C."